(12) United States Patent
Karayi et al.

(10) Patent No.: US 9,110,747 B2
(45) Date of Patent: Aug. 18, 2015

(54) OBTAINING PROGRAM DATA OVER A NETWORK

(75) Inventors: Sumir Karayi, London (GB); Mark Blackburn, Maidenhead (GB)

(73) Assignee: 1ELimited, London (GB)

( * ) Notice: Subject to any disclaimer, the term of this patent is extended or adjusted under 35 U.S.C. 154(b) by 415 days.

(21) Appl. No.: 13/302,656

(22) Filed: Nov. 22, 2011

(65) Prior Publication Data

US 2013/0132943 A1 May 23, 2013

(51) Int. Cl.
*G06F 9/445* (2006.01)

(52) U.S. Cl.
CPC ........................................ *G06F 8/60* (2013.01)

(58) Field of Classification Search
CPC .............. G06F 8/60; G06F 8/61; G06F 8/63; G06F 9/445
USPC .................................................. 717/168–178
See application file for complete search history.

(56) References Cited

U.S. PATENT DOCUMENTS

| | | | | | |
|---|---|---|---|---|---|
| 5,884,038 | A * | 3/1999 | Kapoor | .......................... | 709/226 |
| 6,757,837 | B1 | 6/2004 | Platt et al. | | |
| 7,120,675 | B1 * | 10/2006 | Shupak et al. | ................ | 709/217 |
| 7,793,113 | B2 * | 9/2010 | Bhogal et al. | ................. | 713/191 |
| 8,578,042 | B2 * | 11/2013 | Hu et al. | ........................ | 709/231 |
| 8,713,552 | B2 * | 4/2014 | Horiuchi et al. | .............. | 717/168 |
| 2002/0083156 | A1 | 6/2002 | Wysoczynski | | |
| 2002/0099975 | A1 | 7/2002 | Whiteside et al. | | |
| 2002/0104080 | A1 | 8/2002 | Woodard et al. | | |
| 2002/0147941 | A1 | 10/2002 | Gentile | | |
| 2003/0177208 | A1 | 9/2003 | Harvey | | |
| 2004/0268345 | A1 * | 12/2004 | Lodwick et al. | ............... | 717/176 |
| 2005/0039013 | A1 * | 2/2005 | Bajikar et al. | ................. | 713/172 |
| 2005/0108708 | A1 * | 5/2005 | Im | .................... | 717/178 |
| 2005/0289537 | A1 * | 12/2005 | Lee | ............................ | 717/174 |
| 2006/0020845 | A1 | 1/2006 | Broyles et al. | | |
| 2007/0168721 | A1 | 7/2007 | Luiro et al. | | |
| 2008/0222164 | A1 * | 9/2008 | Bhogal et al. | ................... | 707/10 |
| 2010/0017589 | A1 | 1/2010 | Reed et al. | | |
| 2010/0107153 | A1 * | 4/2010 | Kwon | .......................... | 717/175 |
| 2010/0115576 | A1 | 5/2010 | Hale et al. | | |
| 2010/0234008 | A1 | 9/2010 | Kumar | | |
| 2010/0251206 | A1 * | 9/2010 | Horiuchi et al. | .............. | 717/103 |
| 2010/0299443 | A1 * | 11/2010 | Hu et al. | ........................ | 709/231 |
| 2012/0144383 | A1 | 6/2012 | Mishra et al. | | |

FOREIGN PATENT DOCUMENTS

JP          2004118291 A     4/2004

OTHER PUBLICATIONS

Apr. 23, 2013 Combined Search and Examination Report under Sections 17 and 18(3) in Application No. GB1220344.4, 1e Limited, Applicant, 7 pages.

* cited by examiner

*Primary Examiner* — Qing Chen (57) ABSTRACT

A network comprises a data store storing for computing devices connectable to the network i) identification data associated with the computing devices and ii) source data identifying one or more sources of program data for the devices. The network also has one or more sources of program data associated with the identification data; and a plurality of computing devices. The computing devices each include a communications program configured to communicate with the data store, provide the identification data associated with the computing device and obtain from the data store the source data, and, having obtained the source data from the data store, communicate with the identified source to obtain program data from the identified source.

30 Claims, 5 Drawing Sheets

OBTAINING PROGRAM DATA OVER A NETWORK

TECHNICAL FIELD

The present invention relates to a network, computing devices and other nodes of the network and computer programs for use in the nodes. Embodiments of the invention relate to enabling computing devices to obtain program data from other nodes of the network.

BACKGROUND

Often, a computing device has software which is specific to an organisation or to an individual user. The configuration of the software may also be specific to the organisation or individual. The software or the configuration may become corrupted and/or malfunction. It is desirable to be able to at least reinstall corrupt software and/or to retrieve the correct configuration, regardless of whether the computing device is local to or remote from the organisation that provided the software or set up the configuration.

SUMMARY

In accordance with one aspect of the present invention, there is provided a network having: a data store storing, for computing devices connectable to the network, i) identification data associated with the computing devices and ii) source data identifying one or more sources of program data for the devices; one or more sources of program data associated with the said identification data; and a plurality of computing devices, the computing devices each including a communications program configured to a) communicate with the data store, provide the identification data associated with the computing device and obtain the said source data, from the data store and b), having obtained the said source data from the data store, communicate with the identified source, and obtain program data therefrom.

The term "program data" includes: software; an operating system; an application program; settings for application to application programs; settings for application to a user interface; security settings; and other data associated with application programs.

The data store may be a well known server for example a Domain Name Server. Alternatively it may be a server in an enterprise network.

In accordance with another aspect of the present invention, there is provided a computing device for use in the network of said one aspect, the computing device having a communications program configured to a) communicate with the data store, provide identification data associated with the computing device and obtain from the data store the said source data associated with the provided identification data, and b), having obtained the said source data from the data store, communicate with the identified source and obtain program data therefrom. The communications program may be implemented in firmware in the computing device.

In accordance with a further aspect of the present invention, there is provided a data store for use in the network of said one aspect, the data store storing i) identification data associated with computing devices of the network and ii) source data identifying a source of program data for the computing devices associated with the identification data.

In accordance with a yet further aspect of the present invention, there is provided a computer program which when run on a computing device of a network according to said one aspect configures the computing device to a) communicate with the data store, provide identification data associated with the computing device and obtain from the data store the said source data, and, having obtained the said source data from the data store, and b) communicate with the identified source and obtain program data therefrom. The program may be implemented in firmware.

The identification data associated with a computing device may be data identifying the organisation (e.g. "acorp") to which the computing device is assigned. Also, the identification data could be the user's identification information. So it could be the manufacturer (dell.com), the organization (acorp.com) the application (adobe.com), or the user (fred@gmail.com)—each has a valid reason to store config data and need a way for people to find the config data. If the identification data is for example "acorp", all computers of that organisation would have the same identification data. The source data for the computing devices of "acorp" would be associated in the data store with the identification data "acorp". The communications program would for example send a query including at least the part "acorp" of the user's email address "aname@acorp.com" to the data store, asking for the correct source of program data. The data "acorp" which is in the message acts as the identification data. The data store would provide the location of the program source for the computing devices of "acorp".

The communications program, once it receives the source data, communicates with the identified source. It may provide at least the identification data for example "acorp" or "aname@acorp.com". In some examples, the program provides to the program source authentication data which is matched at the source with corresponding authentication data at the source.

The data store and the communications program of the computing device facilitate the locating of a source of program data for the computing device. The user does not need to know the location of a source of program data suitable for the user's computing device.

The data store may be a DNS server storing SRV records in which case the communications program generates a DNS request compatible with the DNS system. By using DNS, a DNS request is sent to whatever DNS server the computing device is set to communicate with, but it is then forwarded on to the DNS server responsible for the requested domain (in DNS terms the authoritative server) which then replies back with the answer. Thus the user's computing device may be anywhere in the network and be able to communicate with the DNS server storing the relevant SRV records giving the location of a repository storing program data for that user.

Further features and advantages of the invention will become apparent from the following description of illustrative embodiments of the invention, given by way of example only, which is made with reference to the accompanying drawings.

DETAILED DESCRIPTION

Overview of a Network

Figure 1:
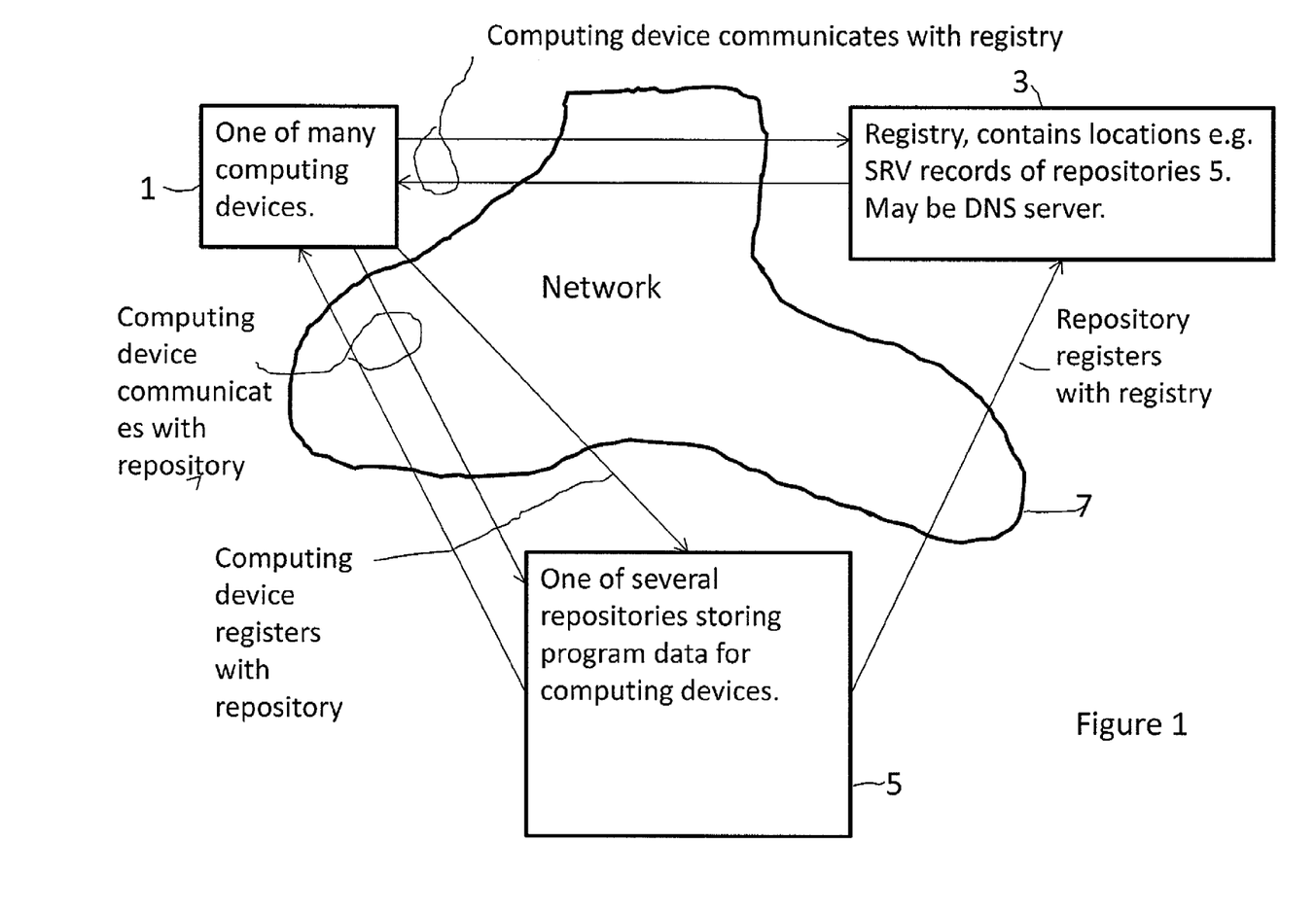
FIG. 1 is a schematic block diagram of a network in accordance with an embodiment of the invention.

The network 7 of FIG. 1 comprises many computing devices 1, only one of which is shown. The computing devices may be fixed devices such as work stations and desktop PCs, MACs and/or mobile devices such as laptops, tablets, mobile telephones. The computing devices may be actively connected to the network 7 intermittently.

A computing device 1 may have a unique personalized configuration set by the end user and/or set by an organization on behalf of their users. A group of computing devices may have the same configuration set by an organization. The organization may be a corporation which sets the configuration for its employees, or a manufacturer which sets the configuration for its customers, a service provider which sets the configuration for its customer's employees or anyone else using their services, or any other type of organization. The configuration may include an operating system image, specific security settings, mandatory applications required by the organization etc. The configuration may also, or alternatively, include local apps, look/feel of user interface, and/or settings for apps and/or the operating system etc. set by the user.

The network 7 may be the Internet, a private enterprise network, or any other network or combination of such networks.

There are times when it would be beneficial to be able to retrieve this unique configuration regardless of whether the end user device is local or remote from the organization that provided it. The device may lose its configuration, become non-functional because the configuration is corrupted, or becomes ineffectual because of miss-configuration. In order to do this there needs to be a simple method to discover and obtain the configuration. For that purpose the network also comprises one or more registries 3 and one or more repositories 5.

An Illustrative Scenario

In one illustrative scenario, a computing device 1 malfunctions due to a software malfunction. As a result, the user wishes to reinstall software on the computing device.

Figure 2:
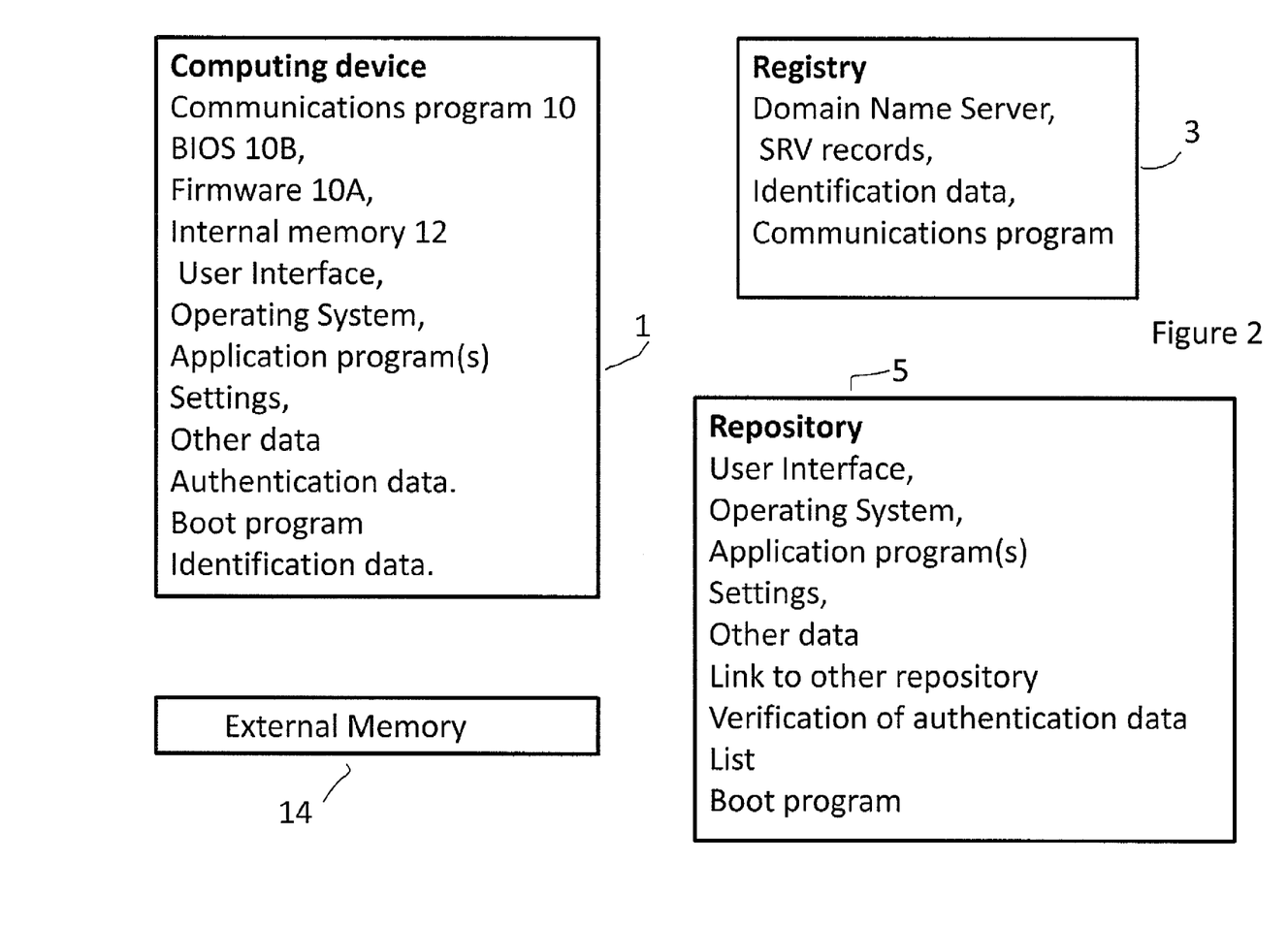
FIG. 2 comprises symbolic representations of a computing device, a registry and a repository of FIG. 1.

The computing device 1 has firmware 10, which may be part of the BIOS 10A, and which operates independently of the operating system and any application programs installed on the computing device. The firmware is able to communicate with the registry 3 and obtain from the registry the location of a source 5 which stores images of software installed on the computing device 1, for example the operating system of the computing device. The firmware receives the location of the repository 5 from the registry 3 and communicates with the repository and obtains the image from the repository. The computing device replaces the original software with the new image.

The firmware may include a boot program to enable installation of the new software, e.g., an operating system, or a boot program may be provided by the repository 5.

Other Scenarios

In other scenarios, instead of, or additionally to, making possible the installation of a new image in the event of a malfunction, a user of a computing device may contact a registry 3 to obtain the location of a repository 5 storing settings data for application programs and/or user interfaces, an operating system and/or application programs and/or other data as described above. These scenarios assume the hardware is operable. In some cases the software is fully operational but needs settings changed or data needs updating. In other cases a program or programs on the computing device is/are malfunctioning and need replacing but the hardware is fully operable.

The Network of FIG. 1

Only one registry is shown in FIG. 1. The, or at least one, registry 3 may be a well known server for example a Domain Name Server.

Only one repository is shown in FIG. 1. The repositories are sources which store program data for installation on the computing devices. The program data may be one or more of: security settings, settings data for an application program and/or a user interface: one or more application programs or parts of programs; and one or more operating systems or parts of operating systems. The program data may comprise images of programs installed on the computing devices. The program data may also include other data useful to an application that is not configuration data (for example exchange rate information, commodity prices, inventory stock amounts etc.). Different repositories 5 may store different program data for different computing devices or groups of computing devices. For example one repository may store images of software installed on all computing devices of employees of a private company X and another repository may store software installed as standard by a computer manufacturer on specific models of their computers.

The registry 3 is a data store which stores source data identifying the network locations of the repositories 5. The registry may be a DNS server. The source data identifying the locations may be an SRV record (Service Record) as used in the Domain Name System to define locations of servers for services specified in the SRV record. An SRV record has the form _service._proto.name TTL class SRV priority weight port target where service: the symbolic name of the desired service in this case a name indicating provision of program data for the computing devices:

proto: the transport protocol of the desired service; this is usually either TCP or UDP.

name: the domain name for which this record is valid.

TTL: standard DNS time to live field.

class: standard DNS class field (this is always IN).

priority: the priority of the target host, lower value means more preferred.

weight: A relative weight for records with the same priority.

port: the TCP or UDP port on which the service is to be found.

target: the canonical hostname of the machine providing the service.

For the purposes of the present invention a new SRV registration setting the term service would need to be defined and approved by IANA (Internet Assigned Names Authority). By way of example only for convenience we use "config" herein as the service term: any other suitable term approved by IANA could be used.

The name would comprise the domain part of the identification data. It would be "acorp.com" for the .example used above, "acorp.com" being the relevant domain. If the identification data is the user's email address for example aname@acorp.com" the registry would look at the domain after the @.

The target would be the network location of the relevant repository.

The computing devices 1 each have a communications program 10 configured to a) communicate with the registry, provide the identification data associated with the computing device by for example using DNS if the registry is a DNS server, and obtain from the registry the said source data, and, b) having obtained the said source data from the registry, communicate with the identified repository, and obtain program data therefrom. By using DNS, a DNS request is sent to whatever DNS server the computing device is set to communicate with, but it is then forwarded on to the DNS server responsible for the requested domain (in DNS terms the authoritative server) which then replies back with the answer. Thus the user's computing device may be anywhere in the network and be able to communicate with the DNS server storing the relevant SRV records giving the location of a repository storing program data for that user.

Obtaining program data from the repository may comprise first getting a list of alternative data from a repository and selecting the required program data from the list. The selection may be performed automatically.

The communications program may be firmware, for example part of the BIOS of the computing device, or it may be stored in a portable memory for example a USB memory. Alternatively the program may be part of the operating system or a part of software installed on the computing device.

Firmware, Alternatives to Firmware, and Memory Devices

The communications program 10 may be stored as firmware 10A in the BIOS 10B for communicating with the registry, for communicating with the repository and for obtaining the program data. Alternatively the communications program may be stored as software or firmware on other internal memory 12 or as software or firmware on a memory device 14 external to the computing device. The internal memory device may be an EEPROM, a PROM, a ROM, a RAM or any other suitable internal memory device. The external memory device may be a USB memory device, a Compact Flash card, an SD card or any other suitable external memory device.

The Registry

The registry 3 stores for each of a plurality of computing devices 1 at least: data, for example an SRV record, identifying the location of a source of program data for that computing device.

The registry has a program 16 which configures the registry to communicate with the computing device 1 over the network 7 to provide the data identifying the location of the appropriate repository.

The Repository

The repository 5 stores for the computing devices 1 at least:
a) 1 or more sets of program data; and
b) data corresponding to the identification data.

The repository 5 has a program 18 which configures the repository 5 to communicate with the computing device 1 over the network 7, validate the identification data of the computing device 1 and provide the program data appropriate to the computing device. In an example, the repository is configured to provide to the computing device a list of program data suitable for the computing device. The user of the computing device selects the program data he/she requires from the list and the repository responds to the selection by providing the selected program data.

Registering the Computing Devices with the Registry and the Repository

As described above, the registry 3 stores data identifying the network locations of the repositories 5 storing program data for computing devices and the, or each, repository 5 stores at least program data for the computing devices.

The computing devices 1 may, in one implementation, send to the repository 5 their identification data and data corresponding to the identification data is stored in the repository 5. The device entries may be registered with the repository either manually by the organization, automatically as part of a programmed registration as part of a software installation process for example, or as part of the original OS installation process etc. If authentication data is used as discussed hereinbelow, the registration process would also incorporate registering authentication data so that it could later be verified.

Registering the Repositories with the Registry

As described above, the registry 3 stores the names or locations of the repositories 5 storing program data for the computing devices. The stored location data are for example SRV records.

In one implementation, the repositories 5 send to the registry 3 the locations/names of the repositories, and the registry stores the locations/names. The locations/names may be transmitted and/or stored in encrypted form. The repositories also provide to the registry data identifying the program data stored in the repository. Thus a repository storing for example standard software of a particular manufacturer registers data identifying that with the registry.

The repository may be registered when it is first set up. The owner of the repository would create a DNS record for their own domain in the same way that they do for other SRV records or equivalent (such as the MX record registered for each Mail server).

Different types of program data may be stored in respective repositories having respective different locations/names which may be in SRV records.

Alternatively, or additionally, a single repository may store two or more different types of program data, the types having respective locations/names which may be SRV records. The locations/names, (e.g., in SRV records) in this case would have, in common, data identifying the repository.

A single repository may store program data of one or more types and may also store location data identifying one or more other locations storing other types of program data for redirecting computing devices seeking the other types of program data to the other locations.

Communications Program

The communications program 10 of a computing device is configured to at least
a) communicate over the network 7 with the registry 1 and the repository 5;
b) send to the registry 3 the identification data associated with the computing device 1;

c) receive from the registry the name/location of the repository storing program data for the identified computing device;

d) send to the named repository at least the identification data associated with the computing device 1;

e) obtain from the repository the required program data; and f) at least utilize the program data.

The identification data may be information identifying one or more of: the user's organisation (e.g. "acorp"); the manufacturer of the computing device; and the model of the computing device and the user's name. The identification data may be the email address of the user.

Example

Figure 3:
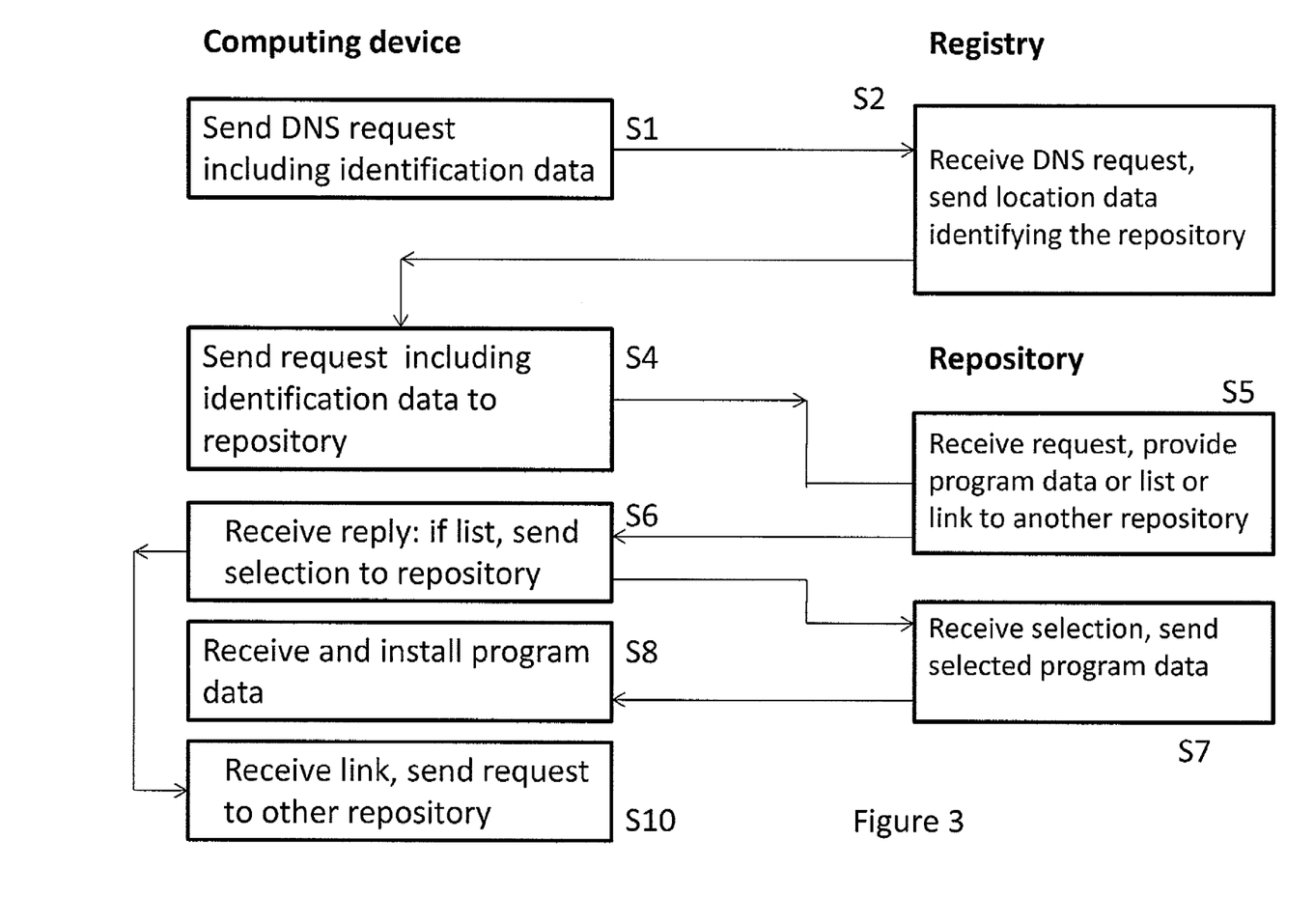
FIG. 3 is a flow chart of an example of the operation of the network of FIG. 1.

FIG. 3

In this example, the registry is a Domain Name Server storing SRV records which identify the locations of repositories. A computing device of "acorp" is remote from the registry and connected in a domain different to that of the registry. The computing device sends S1 over the Internet a DNS request which is effectively "give me the SRV record for service config for acorp". In that message "acorp" is the identification data associated with the computing device.

The registry responds S2 by accessing the SRV record giving the location of a repository associated with "acorp". The communications program of the computing device then sends S4 the identification data to the identified repository. The user's identification data may be verified by the repository and the repository S5 provides a list of program data available. The user selects S6 the required program data from the list. Alternatively, there may be an automated selection based on the type of program data being offered. The communications program sends S6 data identifying the selection to the repository which responds S7 by providing the selected program data. The computing device installs S8 the program data using an installation program which may be supplied by the repository.

The repository may send requested program data without any need for a list. The repository may provide a link to another repository in which case the computing device sends S10 a request to the other repository.

Variations

The content of the identification data may vary and elicit from the registry different locations/names of repositories, and/or elicit from a repository different program data, dependent on the content of the identification data.

Examples of possible types of requests for data stored in a repository 5 and images proved by the repository 5 for that machine include:

1) Manufacturer+model, in response to which a repository provides a generic image of standard Manufacturer software;

2) Manufacturer+model identifier+user's company identifier in response to which a repository is identified and provides an image of the standard user's company configuration for that make and model;

3) Manufacturer+model identifier+user's company+user's name in response to which a repository provides an image of the company's standard software with the user's personal configuration.

In case 1, the relevant repository may be identified as a repository storing only standard Manufacturer software and may be for example a repository owned and maintained by the Manufacturer.

In cases 2 and 3, the relevant repository may be identified as a repository owned and maintained by the company and storing software configured by the company for their employees.

In one example, if the registry does not contain an SRV record of a repository associated "acorp", the communications program may send to the repository a DNS request based on the make and/or model of the computing device to find a repository based on the domain of the device manufacturer: e.g. "give me the SRV record for service 'config' for "manufacturer.com" or "model.manufacturer.com". The registry responds with the location of a repository associated with the manufacturer's domain. The program then sends the identification data to the identified repository.

Once a repository has been located via the registry as discussed above, the repository may be used to store backups either automatically sent directly to the repository or manually sent directly to the repository. The computing device may retrieve the backup directly from the repository.

A repository as described above provides the program data itself directly to the computing device. However, the program data may be provided via other systems. A repository may redirect a computing device to an other repository to obtain program data from the other repository. For that purpose a repository may store location data of the other repositories.

The repositories may be servers operated by the user's company or organisation and/or by the manufacturers of computing devices. Alternatively, the repositories may be operated by third parties. The third party repositories may be in the cloud. The repository of one organisation may be co-hosted in the same instance in the cloud with one of more repositories of other organisations.

Authentication

Figure 4:
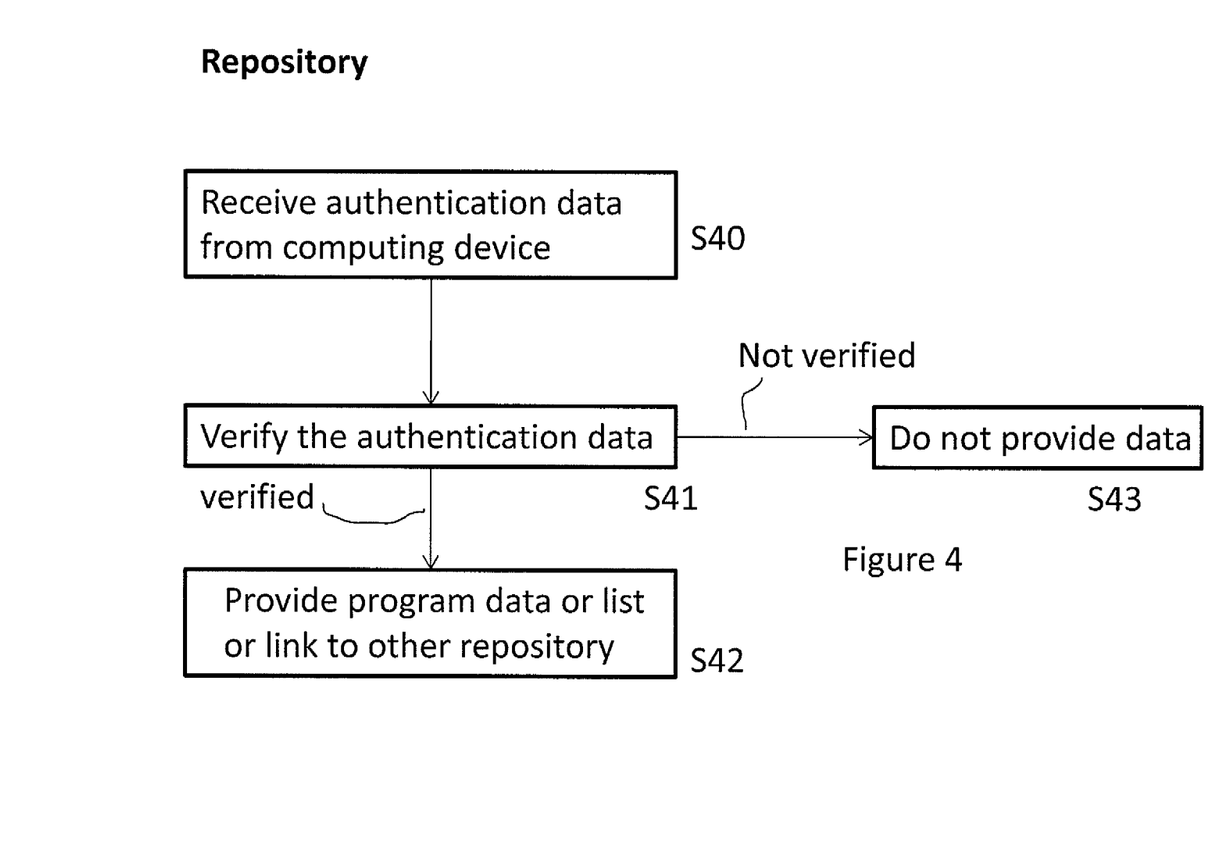
FIG. 4 is a flow chart of an example of processing authentication data at a repository.

FIG. 4

The repository, in another implementation, stores authentication data. The authentication data may be sent S40 to the repository by the computing devices or the repository can be pre-configured with authentication data for each device and the computing devices configured with that data later. The authentication data may be any suitable data: for example digital certificates.

The repository verifies S41 the authentication data. If the authentication data is verified the repository provides S42 the program data or the list or the link; otherwise no data is provided S43.

The authentication data may be encrypted.

Computer

Figure 5:
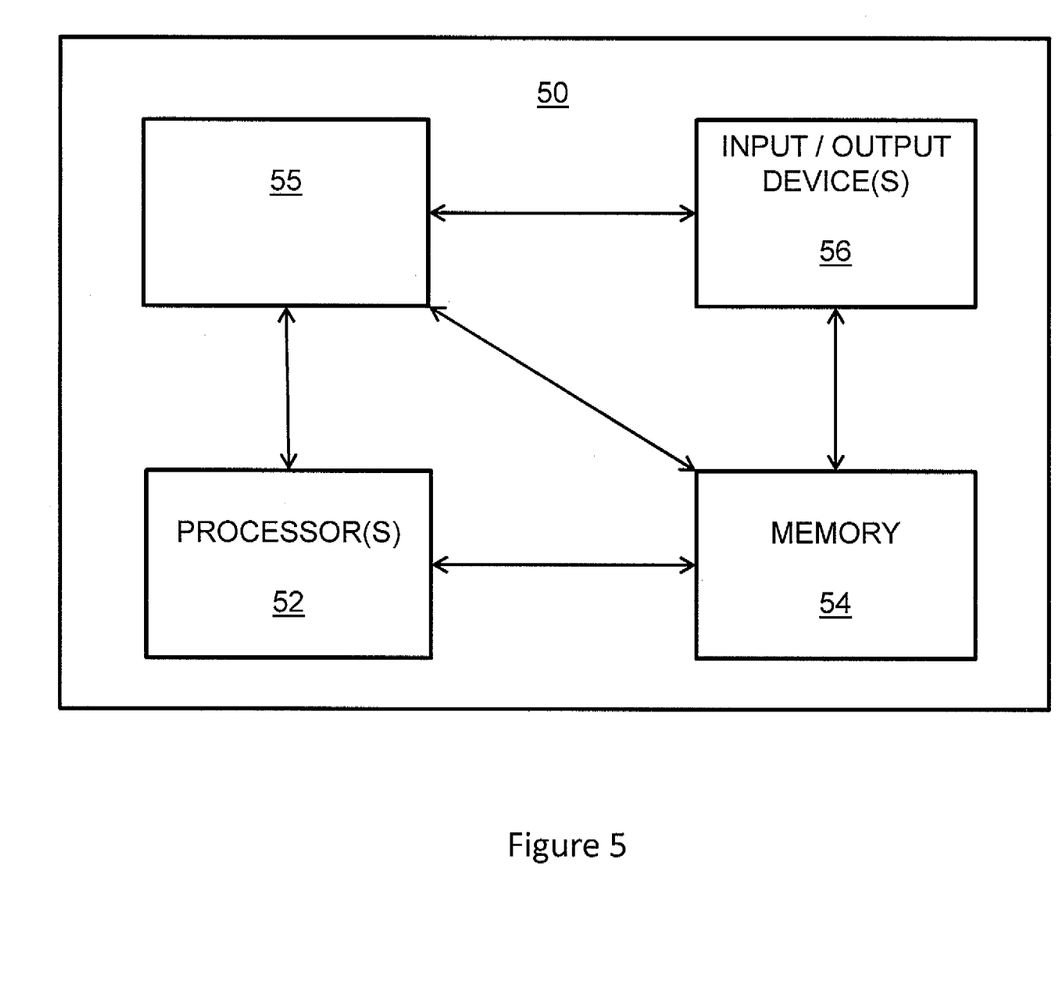
FIG. 5 depicts a high-level block diagram of a computer suitable for use in performing functions described herein.

FIG. 5

FIG. 5 depicts a high-level block diagram of a computer suitable for use in performing functions described herein.

As depicted in FIG. 5, computer 50 includes a processor element 52 (e.g., a central processing unit (CPU) and/or other suitable processor(s)) and a memory 54 (e.g., random access memory (RAM), read only memory (ROM), and the like). The computer 50 also may include a cooperating module/process 55 and/or various input/output devices 56 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors) and/or may be implemented in hardware (e.g., using a general purpose computer, one or more application specific integrated circuits (ASIC), and/or any other hardware equivalents).

It will be appreciated that the functions depicted and described herein may be implemented in software (e.g., for executing on a general purpose computer (e.g., via execution by one or more processors) so as to implement a special purpose computer) and/or may be implemented in hardware (e.g., using one or more application specific integrated circuits (ASIC) and/or one or more other hardware equivalents).

In one embodiment, the cooperating process 55 can be loaded into memory 54 and executed by the processor 52 to implement functions as discussed herein. Thus, cooperating process 55 (including associated data structures) can be stored on a computer readable storage medium, e.g., RAM memory, magnetic or optical drive or diskette, and the like.

It will be appreciated that computer 50 depicted in FIG. 5 provides a general architecture and functionality suitable for implementing functional elements described herein and/or portions of functional elements described herein. For example, the computer 50 provides a general architecture and functionality suitable for implementing one or more of a computing device 1, a registry 3, a repository 5, a network element of network 7, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Computer Programs

Computer programs corresponding to the communications program of the computing devices and the corresponding programs of the registries and repositories may be provide on one or more carriers for installation in the computing devices and in the repositories and registries. The carriers may be selected from the group comprising: a signal; a signal transmission channel; a magnetic, opto-magnetic or optical disc or tape; a DVD; electronic memory; and any other suitable computer readable data carrier. In the case of the communications program for installation on a computing device, the program may be firmware stored on a firmware carrier for example a ROM, PROM or EEPROM, amongst others.

Other

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

Although various embodiments which incorporate the teachings of the present invention have been shown and described in detail herein, those skilled in the art can readily devise many other varied embodiments that still incorporate these teachings.

The invention claimed is:

1. A network comprising:
   a plurality of computing devices;
   one or more sources of program data; and
   a data store storing for the plurality of computing devices i) identification data associated with each computing device of the plurality of computing devices, and ii) source data identifying one or more sources of program data for the plurality of computing devices, wherein the one or more sources of program data being associated with the identification data for said each computing device,
   wherein said each computing device of the plurality of computing devices includes an operating system and a communications program implemented as firmware that is operable independently of the operating system of said each computing device, and wherein the communications program of said each computing device is configured to:
   a) communicate with the data store to provide the identification data associated with said each computing device and obtain from the data store, source data identifying at least one source of the one or more sources identified for said each computing device based on the identification data associated with said each computing device, and
   b) having obtained said source data from the data store, communicate with the identified at least one source of the one or more sources to obtain therefrom program data associated with the identification data for said each computing device.

2. A network according to claim 1, wherein the communications program of said each computing device is further configured to install the program data obtained from the identified at least one source of the one or more sources.

3. A network according to claim 1, wherein the program data of the identified at least one source of the one or more sources includes a program for installing the program data.

4. A network according to claim 1, wherein the communications program of said each computing device is part of a Basic Input/Output System (BIOS).

5. A network according to claim 1, wherein the communications program of said each computing device is operable to send authentication data to the identified at least one source of the one or more sources and the identified at least one source of the one or more sources is operable to allow access thereto dependent on verification of the authentication data by the identified at least one source of the one or more sources.

6. A network according to claim 1, wherein the communications program of said each computing device is arranged to send encrypted authentication data to the identified at least one source of the one or more sources.

7. A network according to claim 1, wherein the communications program of said each computing device is arranged to send, to the identified at least one source of the one or more sources, data relating to a make of said each computing device as the identification data associated with said each computing device.

8. A network according to claim 1, wherein each of the one or more sources of program data comprises a program configured to:

a) receive, from a computing device of the plurality of computing devices, a request including the corresponding identification data associated with said computing device requesting corresponding program data suitable for said computing device, and b) provide the corresponding program data associated with the corresponding identification data to said computing device.

9. A network according to claim 1, wherein the program data of the identified at least one source of the one or more sources comprises one or more of: settings data for an application program, a user interface, an application program and an operating system.

10. A network according to claim 1, wherein the program data of the identified at least one source of the one or more sources comprises an image of a program installed on one or more computing devices of the network.

11. A network according to claim 1, wherein the data store is a Domain Name Server.

12. A network according to claim 11, wherein the source data stored in the data store comprises service (SRV) records defining locations of the one or more sources of program data.

13. A network according to claim 1, wherein the data store comprises a program which, when executed by a processor, configures the data store to:

a) respond to a request from a computing device of the plurality of computing devices, wherein said request includes corresponding identification data associated with said computing device to obtain corresponding source data associated with the corresponding identification data for said computing device, and b) provide the obtained corresponding source data associated with the corresponding identification data to said computing device.

14. A network according to claim 1, wherein one of the one or more sources of program data, responsive to the corresponding identification data of a computing device of the plurality of computing devices received from said computing device, provides to said computing device a list of corresponding program data stored by the one of the one or more sources of program data, and the corresponding communications program of said computing device is configured to respond to a selection of the corresponding program data from the list of corresponding program data to obtain the selected corresponding program data from the one of the one or more sources of program data.

15. A computing device of the plurality of computing devices for use in the network of claim 1, wherein said computing device of the plurality of computing devices includes an operating system and a corresponding communications program implemented as firmware that is operable independently of the operating system of said computing device, and wherein the corresponding communications program of said each computing device is configured to:

a) communicate with the data store to provide corresponding identification data associated with said computing device and receive from the data store the corresponding source data associated with the corresponding identification data for said computing device, b) having received the corresponding source data from the data store, communicate with the corresponding identified at least one source of the one or more sources to obtain therefrom corresponding program data associated with the corresponding identification data for said computing device, and c) install the corresponding program data obtained from the corresponding identified at least one source of the one or more sources.

16. A computing device according to claim 15, wherein the corresponding communications program of said computing device is part of a Basic Input/Output System (BIOS).

17. A computing device according to claim 15, wherein the corresponding communications program of said computing device is operable to send authentication data to the corresponding identified at least one source of the one or more sources and the corresponding identified at least one source of the one or more sources is operable to allow access thereto dependent on verification of the authentication data by the corresponding identified at least one source of the one or more sources.

18. A computing device according to claim 15, wherein the corresponding communications program of said computing device is arranged to send encrypted authentication data to the corresponding identified at least one source of the one or more sources.

19. A computing device according to claim 15, wherein the corresponding communications program of said computing device is arranged to send, to the data store, data relating to a make of said computing device.

20. A server for use in the network of claim 1, the server comprising a processor and a memory storing for each computing device of the plurality of computing devices connectable to the network i) the corresponding identification data associated with the corresponding each computing device, and ii) the corresponding source data identifying for the corresponding each computing device a source of program data associated with the corresponding identification data for the corresponding each computing device, wherein computer instructions stored in the memory of the server, when executed by the processor of the server, configure the server to:

a) respond to a request from the corresponding each computing device, wherein the request includes the corresponding identification data to obtain the source data identifying said source of program data suitable for the corresponding each computing device, and b) provide the obtained source data associated with the corresponding identification data to the corresponding each computing device.

21. A server according to claim 20, wherein the source data comprises service (SRV) records defining locations of the one or more sources of program data.

22. A server according to claim 20, wherein the server is a Domain Name Server.

23. A non-transitory computer readable storage medium storing computer instructions that are executable by a processor in a network, the network comprising:

a plurality of computing devices;

one or more sources of program data; and a data store storing for the plurality of computing devices i) identification data associated with each computing device of the plurality of computing devices, and ii) source data identifying one or more sources of program data for the plurality of computing devices, wherein the one or more sources of program data being associated with the identification data for said each computing device, wherein said each computing device of the plurality of computing devices includes an operating system and a communications program implemented as firmware that is operable independently of the operating system of said each computing device, and wherein said computer instructions, when executed by the processor, cause said each computing device to:
a) communicate with the data store to provide the identification data associated with said each computing device and obtain from the data store, source data identifying at least one source of the one or more sources identified for said each computing device based on the identification data associated with said each computing device, and
b) having obtained said source data from the data store, communicate with the identified at least one source of the one or more sources to obtain therefrom program data associated with the identification data for said each computing device.

24. The non-transitory computer readable storage medium according to claim 23, wherein said computer instructions, when executed by the processor, cause said each computing device to install the program data obtained from the identified at least one source of the one or more sources.

25. The non-transitory computer readable storage medium according to claim 23, wherein said computer instructions, when executed by the processor, cause said each computing device to send authentication data to the identified at least one source of the one or more sources.

26. The non-transitory computer readable storage medium according to claim 23, wherein said computer instructions, when executed by the processor, cause said each computing device to send encrypted authentication data to the identified at least one source of the one or more sources.

27. The non-transitory computer readable storage medium according to claim 23, wherein said computer instructions, when executed by the processor, cause said each computing device to send, to the data store, data relating to a make of said each computing device.

28. The non-transitory computer readable storage medium according to claim 23, wherein said computer instructions, when executed by the processor, cause said each computing device to:
receive from one of the one or more sources of program data, in response to the corresponding identification data of said each computing device, a list of corresponding program data stored by the one of the of the one or more sources of program data, and
respond to a selection of the corresponding program data from the list of corresponding program data to obtain the selected corresponding program data from the one of the one or more sources of program data.

29. A non-transitory computer readable storage medium storing computer instructions which, when executed by a processor in a data store in a network, adapt the operation of the data store to store for a plurality of computing devices connectable to the network i) identification data associated with each computing device of the plurality of computing devices, and ii) source data identifying one or more sources of program data for the plurality of computing devices, wherein at least one source of the one or more sources of program data being associated with the identification data for said each computing device, wherein said each computing device of the plurality of computing devices includes an operating system and a communications program implemented as firmware that is operable independently of the operating system of said each computing device, and wherein the computer instructions, when executed by the processor, configure the data store to:
a) respond to a request from said each computing device of the plurality of computing devices, wherein the request includes the identification data associated with said each computing device to obtain the source data identifying the at least one source of the one or more sources identified for said each computing device based on association with the identification data for said each computing device, and
b) provide the obtained source data identifying the at least one source of the one or more sources to said each computing device.

30. The non-transitory computer readable storage medium according to claim 29, wherein the source data stored in the data store comprises service (SRV) records defining locations of the one or more sources of program data.

\* \* \* \* \*